(12) United States Patent
Derksen et al.

(10) Patent No.: US 9,037,695 B2
(45) Date of Patent: May 19, 2015

(54) MANAGEMENT OF NETWORKED RESOURCES ON DIFFERENT PLATFORMS WITH A COMMON INTERFACE

(75) Inventors: Andreas Derksen, Leimen (DE);
Nikolai P. Angelov, Sofia (BG);
Miroslav Petrov, Wiesloch (DE);
Andreas P. Vogel, Rauenberg (DE);
Fabrizio Muscarella, Mannheim (DE)

(73) Assignee: SAP SE, Walldorf (DE)

( * ) Notice: Subject to any disclaimer, the term of this patent is extended or adjusted under 35 U.S.C. 154(b) by 1712 days.

(21) Appl. No.: 11/967,906

(22) Filed: Dec. 31, 2007

(65) Prior Publication Data

US 2009/0172183 A1 Jul. 2, 2009

(51) Int. Cl.
*G06F 15/173* (2006.01)
*H04L 12/24* (2006.01)
*H04L 29/08* (2006.01)

(52) U.S. Cl.
CPC ............ *H04L 12/24* (2013.01); *H04L 41/00* (2013.01); *H04L 41/0273* (2013.01); *H04L 67/16* (2013.01); *H04L 67/02* (2013.01)

(58) Field of Classification Search
CPC ..... H04L 12/24; H04L 41/00; H04L 41/0273; H04L 67/02; H04L 67/16; G06F 8/60; G06F 8/61; G06F 8/63
USPC .......................................................... 709/223
See application file for complete search history.

(56) References Cited

U.S. PATENT DOCUMENTS

| | | | |
|---|---|---|---|
| 6,854,122 B1 * | 2/2005 | Sheriff et al. .................. | 719/316 |
| 6,874,020 B1 * | 3/2005 | Da Palma et al. ............. | 709/223 |
| 7,698,398 B1 * | 4/2010 | Lai ................................ | 709/223 |
| 7,849,472 B1 * | 12/2010 | Fuchs ............................ | 719/328 |
| 2004/0019662 A1 * | 1/2004 | Viswanath et al. ........... | 709/220 |
| 2005/0216488 A1 * | 9/2005 | Petrov et al. .................. | 707/100 |
| 2005/0216510 A1 * | 9/2005 | Kautzleben et al. ....... | 707/104.1 |
| 2005/0243604 A1 * | 11/2005 | Harken et al. ........... | 365/185.22 |
| 2005/0262477 A1 * | 11/2005 | Kovachka-Dimitrova et al. ............................. | 717/118 |
| 2006/0026552 A1 * | 2/2006 | Mazzitelli et al. ............ | 717/101 |
| 2006/0037030 A1 * | 2/2006 | Kovachka-Dimitrova et al. ............................. | 719/328 |
| 2007/0174439 A1 * | 7/2007 | Ansari ........................... | 709/223 |
| 2007/0260629 A1 * | 11/2007 | Tseitlin et al. ................ | 707/102 |
| 2008/0077940 A1 * | 3/2008 | Nye et al. ...................... | 719/320 |
| 2008/0127076 A1 * | 5/2008 | McArdle ....................... | 717/120 |
| 2010/0275210 A1 * | 10/2010 | Phillips et al. ................ | 718/102 |

OTHER PUBLICATIONS

Frank Vahid, "The Softening of Hardware,"Computer, vol. 36, No. 4, pp. 27-34, Apr. 2003, doi:10.1109/MC.2003.1193225.*

Steve McConnell, "Who Needs Software Engineering?," IEEE Software, vol. 18, No. 1, pp. 5-8, Jan./Feb. 2001, doi:10.1109/MS.2001.903148.*

Andrew Tanenbaum, Structured computer organization; (2nd ed.), Prentice-Hall, Inc., Upper Saddle River, NJ, 1984.*

(Continued)

*Primary Examiner* — June Sison

(74) *Attorney, Agent, or Firm* — Blakely Sokoloff Taylor & Zafman LLP

(57) ABSTRACT

A system and method to manage networked resources from a central management node. The management node is exposed to a common web services interface for a plurality of managed nodes having different system stacks. The management node and the managed nodes employ a schema to encode arbitrary data corresponding to management requests and responses into web services messages.

13 Claims, 3 Drawing Sheets

(56) References Cited

OTHER PUBLICATIONS

Benjamin G. Sullins and Mark B. Whipple, "JMX in Action," Manning Publishing Co., Greenwich, CT, 2003, ISBN: 1930110561.*

J. Steven Perry, "Java Management Extensions," O'Reily & Associates, Sebastopol, CA, Jun. 2002.*

The Java API for XML-Based Web Services (JAX-WS) 2.0 (Apr. 19, 20006); Sun Microsystems; Editors: Chinnici et. al.*

* cited by examiner

MANAGEMENT OF NETWORKED RESOURCES ON DIFFERENT PLATFORMS WITH A COMMON INTERFACE

BACKGROUND

1. Field

Embodiments of the invention relate to management of resources in a computer system. More specifically, embodiments of the invention relate to providing the unified interface for management communications independent of the underlying system stack on the managed nodes.

2. Background

Historically, each platform has its own management interface. For example, the management interface for advanced business application programming (ABAP) platforms differs from the management interface for Java platforms, such as the Java 2 Enterprise Edition (J2EE) engine, which in turn also differs from a management interface for platforms created in native C. At a minimum, these different interfaces require the management node to maintain different protocols for management of each managed node. Moreover, the management node is required to know which underlying system stack it is attempting to manage when sending out management requests. Accordingly, the platform dependent nature of the management interface make centralize management of different nodes based on different systems stacks cumbersome or impossible.

SUMMARY OF THE INVENTION

A system and method to manage networked resources from a central management node is described. The management node is exposed to a common web services interface for a plurality of managed nodes having different system stacks. The management node and the managed nodes employ a schema to encode arbitrary data corresponding to management requests and responses into web services messages.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
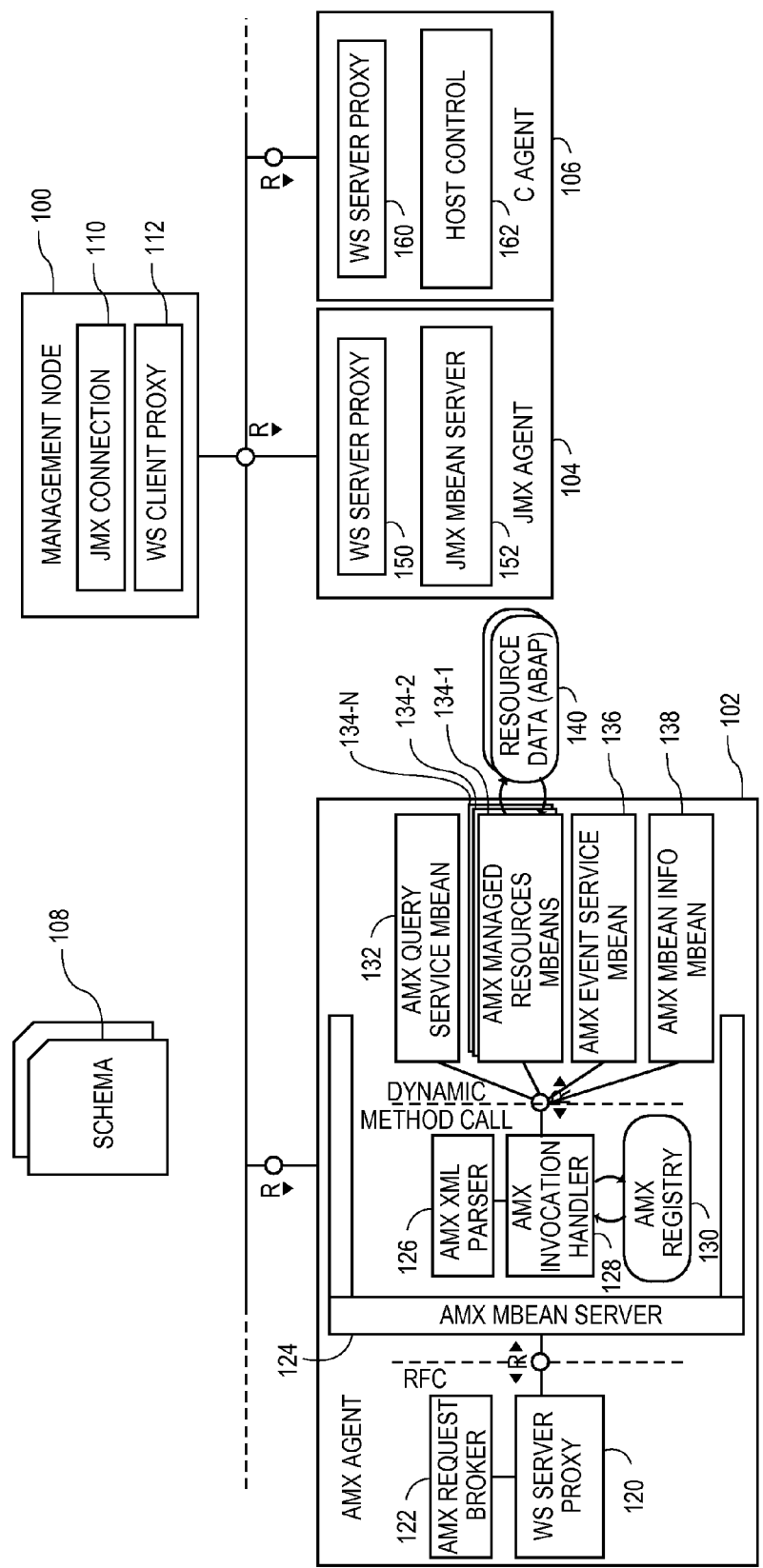
FIG. 1 is a block diagram of the system of one embodiment of the invention.

FIG. 1 is a block diagram of the system of one embodiment of the invention. The system provides the unified interface for management of different platforms. The interface is independent of the underlying system software stack. The management node 100 sends management requests to manage nodes 102, 104, 106. Communication between the management node 100 and the managed nodes 102, 104, 106 is through a web services interface. In a depicted embodiment, manage node 102 has an advanced business programming applications (ABAP) system stack and is referred to as an AMX agent. Managed node 104 has a Java system stack and is referred to as a JMX agent. Managed node 106 has a C system stack and is referred to as a C Agent. Management node 100 includes a Java management extensions (JMX) connection 110 to create management requests satisfying the JMX specification promulgated by Sun Microsystems of Mountain View, Calif. The JMX connection uses Query Service MBean to query local MBeans to provide Application Server Port Number, where the web service is published, and authentication details. Using these details the management node 100 uses its web services client proxy 112 to connect to remote MBean servers on the managed nodes 102, 104, 106.

JMX connection 110 uses a schema 108 to encode management requests as an extensible markup language (XML) string. In one embodiment, the schema 108 includes two XML schema document (XSD) files. The first such file defines the XML data format for metadata or type definitions. The second file defines the XML data format for values.

The data value XML format is used to transport arbitrary data structures such as the attribute values, method parameter values and method return value of the Mbeans and is defined as a complex type in the schema:

```
<xs:element name="value" type="nwa-data:value"/>,
<xs:complexType name="value">
    <xs:choice>
        <xs:group ref="nwa-data:simpleValue"/>
        <xs:group ref="nwa-data:compositeValue"/>
        <xs:group ref="nwa-data:arrayValue"/>
        <xs:element ref="nwa-data:propertiesValue"/>
    </xs:choice>
</xs:complexType>
```

From the definition the data value is a choice between the group of simple/composite/array value.

The "simple" value group (simple field in AMX) is defined in the schema as sequence of simple type and simple value:

```
<!- simple group (corresponds to ABAP elementary data type) -->
<xs:group name="simpleValue">
<xs:sequence>
    <xs:element ref="nwa-type:simpleType" minOccurs="0"/>
    <xs:choice>
        <xs:element name="character" type="xs:unsignedShort"/>
        <xs:element name="string" type="xs:string"/>
        <xs:element name="boolean" type="xs:boolean"/>
        <xs:element name="decimal" type="xs:decimal"/>
        <xs:element name="float" type="xs:float"/>
        <xs:element name="double" type="xs:double"/>
        <xs:element name="date" type="xs:dateTime"/>
        <xs:element name="long" type="xs:long"/>
        <xs:element name="int" type="xs:int"/>
        <xs:element name="integer" type="xs:integer"/>
        <xs:element name="short" type="xs:short"/>
        <xs:element name="byte" type="xs:byte"/>
        <xs:element name="duration" type="xs:duration"/>
        <xs:element name="hexBinary" type="xs:hexBinary"/>
        <xs:element name="unsignedByte" type="xs:unsignedByte"/>
        <xs:element name="base64Binary" type="xs:base64Binary"/>
    </xs:choice>
</xs:sequence>
</xs:group>
<!- simple type-->
<xs:element name="simpleType" type="simpleType"/>
<xs:simpleType name="simpleType">
    <xs:restriction base="xs:string">
        <xs:enumeration value="xs:string"/>
        <xs:enumeration value="xs:boolean"/>
        <xs:enumeration value="xs:decimal"/>
        <xs:enumeration value="xs:float"/>
        <xs:enumeration value="xs:double"/>
        <xs:enumeration value="xs:dateTime"/>
        <xs:enumeration value="xs:long"/>
```

```
            <xs:enumeration value="xs:int"/>
            <xs:enumeration value="xs:integer"/>
            <xs:enumeration value="xs:short"/>
            <xs:enumeration value="xs:byte"/>
            <xs:enumeration value="xs:duration"/>
            <xs:enumeration value="xs:base64Binary"/>
            <xs:enumeration value="xs:unsignedShort"/>
            <xs:enumeration value="xs:hexBinary"/>
            <xs:enumeration value="xs:unsignedByte"/>
        </xs:restriction>
    </xs:simpleType>
```

XML example of simple string value which would be valid against the schema:

```
<?xml version="1.0" encoding="UTF-8"?>
<nwa-data:value>
    <nwa-type:simpleType>xs:string</nwa-type:simpleType>
    <nwa-data:string>Hello, world!</nwa-data:string>
</nwa-data:value>
```

Due to the optional (minOccurs="0") simpleType element, the following example would be also valid against the schema:

```
<?xml version="1.0" encoding="UTF-8"?>
<nwa-data:value>
    <nwa-data:string>Hello, world!</nwa-data:string>
</nwa-data:value>
```

The composite value group (structure in AMX) is defined in the schema as a sequence of two complex elements:

```
<!-- composite group (corresponds to ABAP structure)-->
<xs:group name="compositeValue">
    <xs:sequence>
        <xs:element ref="nwa-type:compositeType" minOccurs="0"/>
        <xs:element ref="nwa-data:composite"/>
    </xs:sequence>
</xs:group>
<!-- composite type (nwa__protocol__type.xsd)-->
<xs:element name="compositeType" type="compositeType"/>
<xs:complexType name="compositeType">
    <xs:complexContent>
        <xs:extension base="baseType">
            <xs:sequence>
                <xs:element name="compositeItem" type="itemType" maxOccurs="unbounded"/>
            </xs:sequence>
            <xs:attribute name="typeID" type="xs:string" use="optional"/>
        </xs:extension>
    </xs:complexContent>
</xs:complexType>
<!-- composite value (nwa__protocol__data.xsd) -->
<xs:element name="composite" type="composite"/>
<xs:complexType name="composite">
    <xs:sequence>
        <!-- elements order and type must follow the corresponding type -->
        <xs:element name="compositeItem" type="item" maxOccurs="unbounded"/>
    </xs:sequence>
</xs:complexType>
```

The following is an example of a composite data value valid against the schema:

```
<?xml version="1.0" encoding="utf-8"?>
<nwa-data:value typeName="SAP__ITSAM__Structure">
<!-- type description (nwa__protocol__type.xsd)-->
    <nwa-type:description>n/a</nwa-type:description>
    <nwa-type:compositeItem typeName="C1">
        <nwa-type:description>n/a</nwa-type:description>
        <nwa-type:simpleType>xs:string</nwa-type:simpleType>
    </nwa-type:compositeItem>
    <nwa-type:compositeItem typeName="C2">
        <nwa-type:description>n/a</nwa-type:description>
        <nwa-type:simpleType>xs:boolean</nwa-type:simpleType>
    </nwa-type:compositeItem>
    <nwa-type:compositeItem typeName="C3">
        <nwa-type:description>n/a</nwa-type:description>
        <nwa-type:compositeType typeName="SAP__ITSAM__InnerStructure">
            <nwa-type:description>n/a</nwa-type:description>
            <nwa-type:compositeItem typeName="C1">
                <nwa-type:description>n/a</nwa-type:description>
                <nwa-type:simpleType>xs:string</nwa-type:simpleType>
            </nwa-type:compositeItem>
            <nwa-type:compositeItem typeName="C2">
                <nwa-type:description>n/a</nwa-type:description>
                <nwa-type:simpleType>xs:short</nwa-type:simpleType>
            </nwa-type:compositeItem>
            <nwa-type:compositeItem typeName="C3">
                <nwa-type:description>n/a</nwa-type:description>
                <nwa-type:simpleType>xs:string</nwa-type:simpleType>
            </nwa-type:compositeItem>
            <nwa-type:compositeItem typeName="TimeStamp">
                <nwa-type:description>n/a</nwa-type:description>
                <nwa-type:simpleType>xs:dateTime</nwa-type:simpleType>
            </nwa-type:compositeItem>
        </nwa-type:compositeType>
    </nwa-type:compositeItem>
    <nwa-type:compositeItem typeName="TimestampP">
        <nwa-type:description>n/a</nwa-type:description>
        <nwa-type:simpleType>xs:dateTime</nwa-type:simpleType>
    </nwa-type:compositeItem>
</nwa-type:compositeType>
<!-- value (nwa__protocol__data.xsd)-->
<nwa-data:composite>
    <nwa-data:compositeItem name="C1">
        <nwa-data:string>Hello, world!</nwa-data:string>
    </nwa-data:compositeItem>
    <nwa-data:compositeItem name="C2">
        <nwa-data:boolean>false</nwa-data:boolean>
    </nwa-data:compositeItem>
    <nwa-data:compositeItem name="C3">
        <!- in case the inner structure is initial it will be represented as a NULL value -->
        <nwa-data:unsignedByte>32</nwa-data:unsignedByte>
    </nwa-data:compositeItem>
    <nwa-data:compositeItem name="TimestampP">
        <nwa-data:date>2007-01-18T09:16:33.317386Z</nwa-data:date>
    </nwa-data:compositeItem>
</nwa-data:composite>
</nwa-data:value>
```

The array value group (table in AMX) defined in the schema as a sequence of the following complex elements:

```
<!-- array value group -->
<xs:group name="arrayValue">
    <xs:sequence>
        <xs:element ref="nwa-type:arrayType" minOccurs="0"/>
        <xs:element ref="nwa-data:array" minOccurs="0"/>
        <xs:element ref="nwa-data:primitiveArray" minOccurs="0"/>
    </xs:sequence>
</xs:group>
<!-- array type -->
```

-continued

```
<xs:element name="arrayType" type="arrayType"/>
<xs:complexType name="arrayType">
    <xs:complexContent>
        <xs:extension base="baseType">
            <xs:sequence>
                <xs:element         name="arrayElement"
type="itemType"/>
                <xs:element name="dimension" type="xs:int"/>
            </xs:sequence>
        </xs:extension>
    </xs:complexContent>
</xs:complexType>
<!-- array value -->
<xs:element name="array" type="array"/>
<xs:complexType name="array">
    <xs:sequence>
        <xs:element name="arrayElement" type="item" minOccurs="0"
maxOccurs="unbounded"/>
    </xs:sequence>
    <xs:attribute name="className" type="xs:string" use="optional"/>
</xs:complexType>
```

The composite/array type contains a sequence of one or more compositeItems/arrayElements which could be of different types like simple/composite/array type:

```
<!-- item type (corresponds to ABAP structure component or line of
table) -->
<xs:complexType name="itemType">
    <xs:complexContent>
        <xs:extension base="baseType">
            <xs:sequence>
                <xs:choice>
                    <xs:element ref="simpleType"/>
                    <xs:element ref="compositeType"/>
                    <xs:element ref="arrayType"/>
                </xs:choice>
            </xs:sequence>
        </xs:extension>
    </xs:complexContent>
</xs:complexType>
```

The composite/array value contains a sequence of one or more compositeItems/arrayElements which could be of different types like simple/composite/array value:

```
<!-- Item is always inside composite element and wraps simple
(mixed=true), or array element -->
<xs:complexType name="item">
    <xs:choice>
        <xs:element ref="nwa-data:composite"/>
        <xs:element ref="nwa-data:array"/>
        <xs:element ref="nwa-data:primitiveArray"/>
        <xs:element ref="nwa-data:propertiesValue"/>
        <xs:group ref="nwa-data:simpleValue"/>
    </xs:choice>
    <xs:attribute name="name"/>
</xs:complexType>
```

The management node 100 includes the web services client proxy 112 to which each of the managed nodes 102, 104, 106 expose a common web services interface. JMX connection 110 provides the XML string to the web services client proxy 112, the web services client proxy 112 creates a web services message containing the XML string. In one embodiment, web services client proxy 112 creates simple object access protocol (SOAP) message having the XML string as its payload. The web services message, including the request, is placed on the transport layer and claimed by web services server proxy in the target managed node 102, 104, or 106.

In the case of a management request to JMX agent 104, web services server proxy 150 claims the message off of the transport layer removes the header and other web services information and passes the XML string to JMX management bean (MBean) server 152, JMX MBean server 152 deserializes the XML string to recover the request object formulates a response to the request object consistent with schema 108 and passes the XML string to the web services server proxy to be returned as part of the payload of our response web services message.

For requests directed to manage node 106, web services server proxy 160 claims the message off of the transport layer and passes the XML string to host control 162. Host control 162 interprets the string consistent with schema 108 and prepares a response XML string satisfying the schema 108 which is then returned to management node 100 in the payload of a web services response message.

The request having managed node 102 as their target are claimed by web services server proxy 120 from the transport layer. Within the ABAP management extension (AMX) agent 102, the AMX MBean server offers an interface that allows registration and deregistration of MBeans, getting and setting MBean attribute values, and method invocation of the MBeans. However, in ABAP process contexts are strictly bound to the actual user and are only available as long as the work processes is running on that context. As a result, neither the AMX MBean server 124 nor any of the AMX MBeans live somewhere in ABAP, but rather are created each time a request has to be processed.

This requires that the server and the MBeans are instantiated, on request. Therefore, the AMX MBeans server 124 instantiates the MBeans in its context to be able to access them when a request is received. Since the MBeans are not persistent beyond a request/response transaction, the necessary for the MBean to persistently store its status if it is desirable to continue in the previous state when reinstantiated on a subsequent request.

Significantly, these facets of ABAP also make it possible that two parallel requests directed to managed node 102 would result in the creation of two different contexts and two different MBean servers. Accordingly, an AMX request broker 122 is provide to insure that if multiple AMX MBean servers exist within agent 102, the request coming in through web services server proxy 120 is directed to the correct MBean server. The AMX request broker 122 relieves the burden on the management node 100 of knowing to which MBean server on the managed node 102 the request should be directed. In one embodiment, AMX request broker 122 uses a remote function call to get the MBean server location.

Once the location is known, web services server proxy 120 passes the XML string from the payload of the web services message to AMX MBean server 124. The AMX XML parser 126 uses schema 108 to recover the request object. In one embodiment, AMX MBean server 124 exposes five functions to be remotely accessed: i) "get," which allows a request to get the value of a specific attribute of a named MBean; ii) "put," which allows a request to set the value of a specific attribute of a named MBean; iii) "invoke," which allows the request to invoke an operation on an MBean; iv) "get attributes," which allows a request to get the values of several attributes of a named MBean; and v) "set attributes," which allows a request to set the value of several attributes of a named MBean. In all cases, the MBean is identified by its object name.

As noted previously AMX MBean server allows for registration and deregistration of MBeans. To that end, local functions "register MBean," registers a managed resource as an MBean in the AMX registry 130 and "unregister MBean," unregisters a managed resource from the AMX registry 130. Finally, local function "query names" is provided, which gets the names of MBean controlled by type AMX registry 130. This method allows names of all MBeans to be obtained or the names of a set of MBeans specified by the pattern matching to be obtained. The set of object names for the MBeans selected are returned.

AMX invocation handler 128 creates the MBeans necessary to handle the request. A set of MBeans include AMX query service 132, AMX event service 136, AMX MBeanInfo service 138 and AMX managed resource MBeans 134-1, 134-2, 134-N (generically 134). The managed resource MBeans 134 each model a managed resource based on resource data 140, which provides the data corresponding to each physical resource that is managed.

The AMX query service itself is implemented as an MBean. It is used to resolve local queries for MBean object names. The method QUERYNAMESWITHMULTIPLE-PATTERNS accepts object name patterns as input. It returns all object names matching to these patterns. Furthermore the MBean supports mass operations as INVOKEFORNAMES (invokes a method for many MBeans) and GETATTRVAL-UESFORNAMES (returns attribute values for many MBeans). The AMX event service MBean allows the registration of events. If such an event is raised, the management node receives a notification. The AMX MbeanInfo service provides the meta data (method signature) about MBeans.

AMX MBean server 124 constructs the response to an outstanding request as an XML string valid under schema 108 and passed it back to the web services server proxy 120. The web services server proxy 120 constructs a web services message response having the XML string in its payload. That message is then returned to management node 100. Management node 100 may then recover the XML string and deserialize it consistent with the schema 108.

Figure 2:
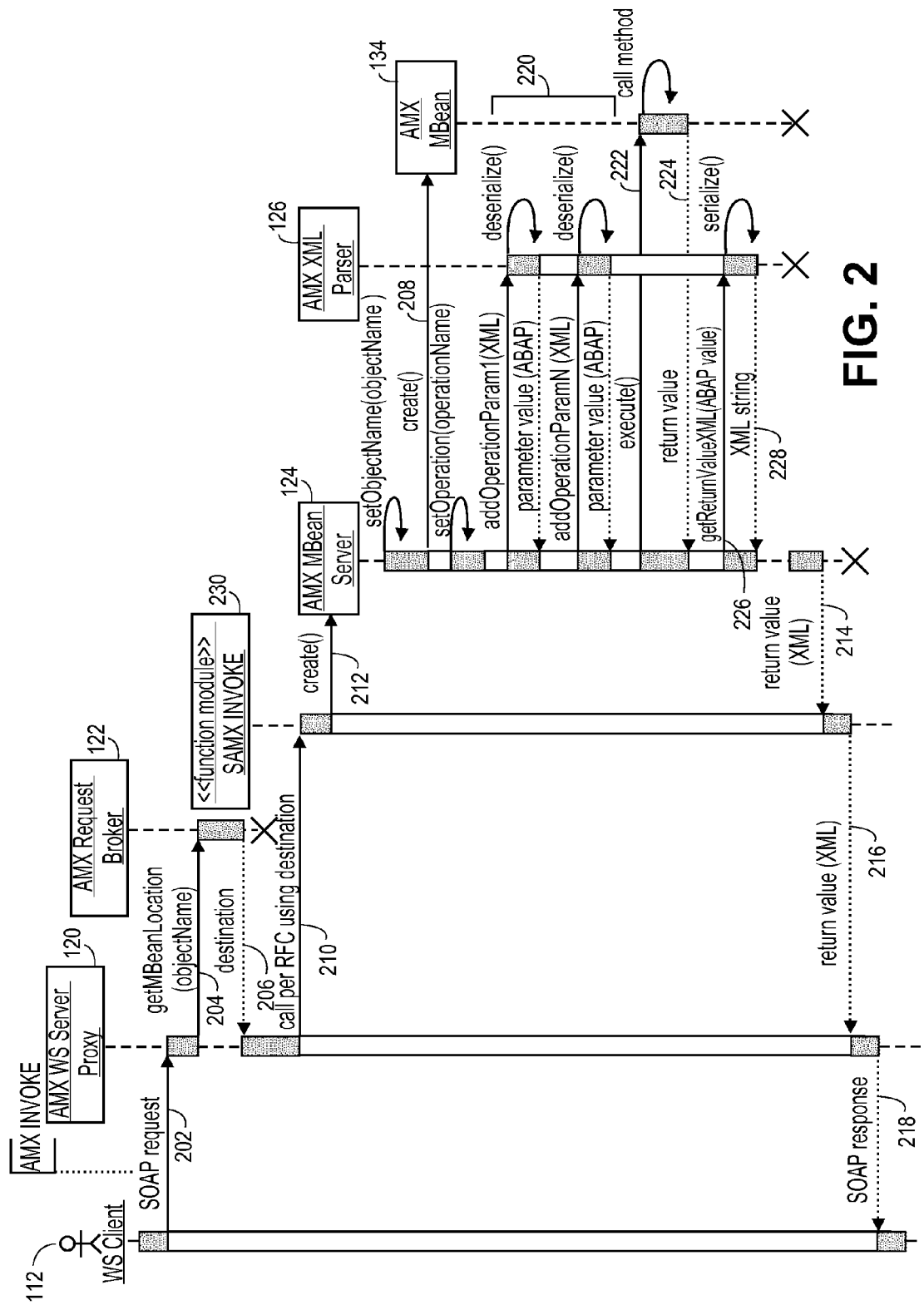
FIG. 2 is an example sequence diagram for a request response transaction in one embodiment of the invention.

FIG. 2 is an example sequence diagram for an AMX request response transaction in one embodiment of the invention. This example is the function INVOKE. This method is used to query local AMX MBeans and invoke an operation of an MBean by passing the corresponding object name, the operation name and the operation parameter values (which are arbitrary data structures) passed within the base64 encoded XML strings through the web service interface according to the schema 108.

A SOAP request is sent from web services client 112 to WS Server proxy 120. AMX Request Broker 122 performs a remote function call to obtain the MBean location for the object name specified in the SOAP request and returns the destination at 206 to the web services proxy 120. Web services proxy uses the destination returned from the remote function call to call the function module SAMX_INVOKE 230 to create the MBean server 124 at 212. The AMX server 124 creates the AMX MBean 134 at 208. At 220, AMX XML parser 126 parses the incoming XML string that was encoded consistent with the schema and deserialized the string to acquire ABAP parameters to execute on the AMX MBean 134 at 222. The executed method returns an ABAP value at 224. The returned ABAP value is serialized and returned as a XML string valid under the schema at 228. The AMX MBean server then returns the return to SAMX_INVOKE 230 at 219. SAMX_INVOKE function 230 returns the XML value at 216 to the web services server proxy 120. The return values (e.g., the XML string) are included in a payload of a SOAP response 218 back to web services client 112.

Figure 3:
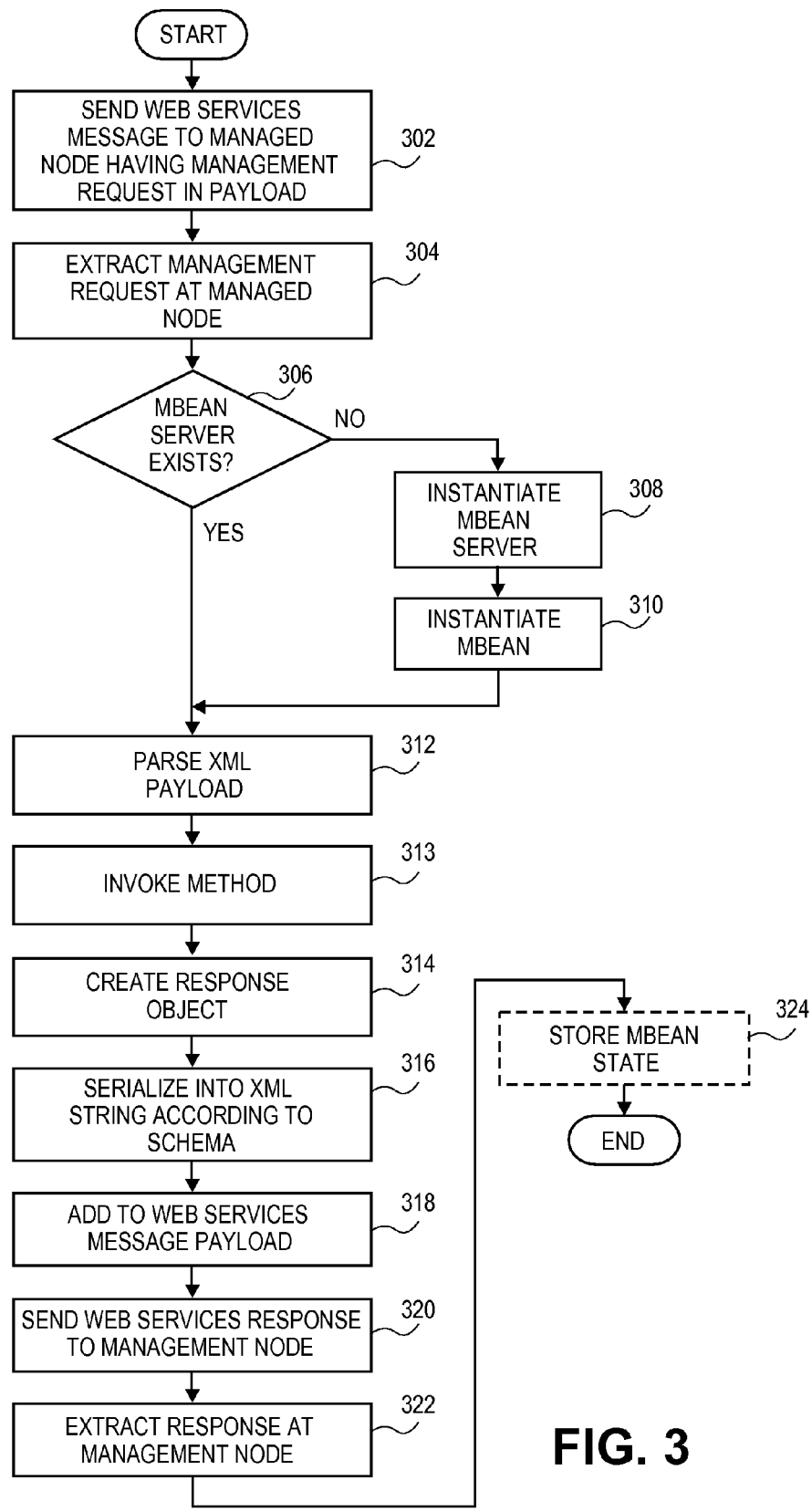
FIG. 3 is a flow diagram of operation of one embodiment of the invention.

FIG. 3 is a flow diagram of operation of one embodiment of the invention. At block 302, a management node sends the web services message to a managed node having a management request contained in the payload of the web services message. At block 304, the managed node extracts the management request from the web services message. At block 306, a determination is made if an MBean server exists. For example, a Java based managed node would not need to recreate an MBean server each time as an MBean server would be resident. However, an ABAP managed node would not have an existing MBean server thereon. If no MBean server exists, the MBean server are instantiated at block 308. Subsequently, the MBeans to be used at the MBean server is instantiated at block 310. Once the MBean server exists or is instantiated, the XML payload is parsed at block 312. At block 314, a response object is created based on the request received. At block 313, the system involves a method to obtain the information needed for a response. The response object is serialized into an XML string according to a schema at block 316. The serialized XML string is added to the payload of a web services response message at block 318 by web services server proxy in the managed node. That response is put on the transport layer directed to the management node at block 320. The management node then extracts a response from the web services message and recreates and object corresponding the XML string at block 322. If appropriate, the state of MBeans are stored at block 324 so that the state can be persistent in the event that a subsequent request requires that current state. This is only applicable to platforms where the MBeans and MBeans server are recreated with each request.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other types of machine-readable media suitable for storing electronic instructions. Some embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
    a management node included in a web services server and including a web services client proxy and a Java management extension (JMX) connection, the web services server having a processor to execute the management node, and hardware including a memory to store the management node, the management node to transmit non-system stack specific management requests to a plurality of managed nodes;
a first managed node having a first underlying system stack and a query service to receive management requests from the management node, the first underlying system stack comprising an advanced business programming applications (ABAP) system stack;
a second managed node having a second underlying system stack and the query service to receive management requests from the management node, the second underlying system stack different than the first underlying system stack;
a first and a second web service residing on the first and second managed nodes, respectively, both web services providing a common interface for the web services client proxy of the management node to exchange web service messages with the first and second managed node; and
a schema employed by the management node and each managed node to encode management request data into a web service message via the JMX connection,
wherein the first and second managed nodes are stored in a memory of at least one client device having hardware including the memory to store the respective system stack and a processor to execute the respective system stack, and wherein the first and second managed nodes to each extract the web service message, via the query service, to a management request consistent with the respective underlying system stack of the managed node, and wherein the first managed node to further instance a virtual element specific to a management request web service message encoded via the JMX connection, and store a context of the virtual element for use by a subsequent received management request.

2. The system of claim 1 where the web service defines a put operation, a get operation, a put attributes operation, a get attributes operation, and an invoke operation.

3. The system of claim 1 wherein the schema comprises:
a mapping of data types used by the first managed node and the second managed node to an extensible markup language representation of the data types.

4. The system of claim 1 wherein the schema comprises:
a plurality of extensible markup language (XML) schema description files.

5. A method comprising:
exposing, at a first and second managed node, a common web service interface to a management node via a first and a second web service residing on the first and the second managed node, respectively, to receive management requests from the management node, the first and second managed node to include first and second distinct underlying system stacks respectively, the first underlying system stack comprising an advanced business programming applications (ABAP) system stack, the management node to include a web services client proxy and a Java management extension (JMX) connection;
receiving, at the first and second managed node, a non-system stack specific management request encoded as web service message data according to a schema;
extracting, at the first and second managed node, the web service message to a management request consistent with the respective underlying system stack of each managed node;
encoding, at the first and second managed node, management data as web service message data according to the schema;
transmitting the encoded management data from the first and second managed nodes to the management node through the web service interface;
instancing, via the first managed node, a virtual element specific to a management request web service message encoded via the JMX connection; and
storing a context of the virtual element for use by a subsequent received management request.

6. The method of claim 5 wherein transmitting comprises:
nesting an extensible markup language (XML) string within a simple object access protocol (SOAP) message.

7. The method of claim 6 further comprising:
recovering the XML string from the SOAP message; and
deserializing the string to obtain a management object.

8. A machine-accessible non-transitory storage medium containing instructions that, when executed, cause a machine to:
expose, at a first and second managed node, a common web service interface to a management node via a first and a second web service residing on the first and the second managed node, respectively, to receive management requests from the management node, the management node stored in a memory of a web services server, the first and second managed node to include first and second distinct underlying system stacks respectively, the first underlying system stack comprising an advanced business programming applications (ABAP) system stack, the management node to include a web services client proxy and a Java management extension (JMX) connection;
receive, at the first and second managed node, a non-system stack specific management request encoded as web service message data according to a schema;
extract, at the first and second managed node each stored in a memory in at least one client device, the web service message to a management request consistent with the respective underlying system stack of each managed node;
encode, at the first and second managed node, management data as web service message data according to the schema;
transmit the encoded management data from the first and second managed nodes to the management node through the web service interface;
instance, via the first managed node, a virtual element specific to a management request web service message encoded via the JMX connection; and
store a context of the virtual element for use by a subsequent received management request.

9. The machine-accessible non-transitory storage medium of claim 8, wherein the instructions causing the machine to transmit cause the machine to:
nest an extensible markup language (XML) strung within a simple object access protocol (SOAP) message.

10. The machine-accessible non-transitory storage medium of claim 9, wherein the instructions further comprise instruction to cause the machine to:
recover the XML string from the SOAP message; and
deserialize the string to obtain a management object.

11. The machine-accessible non-transitory storage medium of claim 8, wherein the second distinct underlying system stack of the second managed node is comprised of one of a JAVA system stack, or a C system stack.

12. The system of claim 1, wherein the second distinct underlying system stack of the second managed node is comprised of one of a JAVA system stack, or a C system stack.

13. The method of claim 5, wherein the second distinct underlying system stack of the second managed node is comprised of one of a JAVA system stack, or a C system stack.

* * * * *